(No Model.)
M. L. MAIN.
HEDGE AND WIRE WOVEN FENCE.
No. 426,291. Patented Apr. 22, 1890.
Fig. 1.
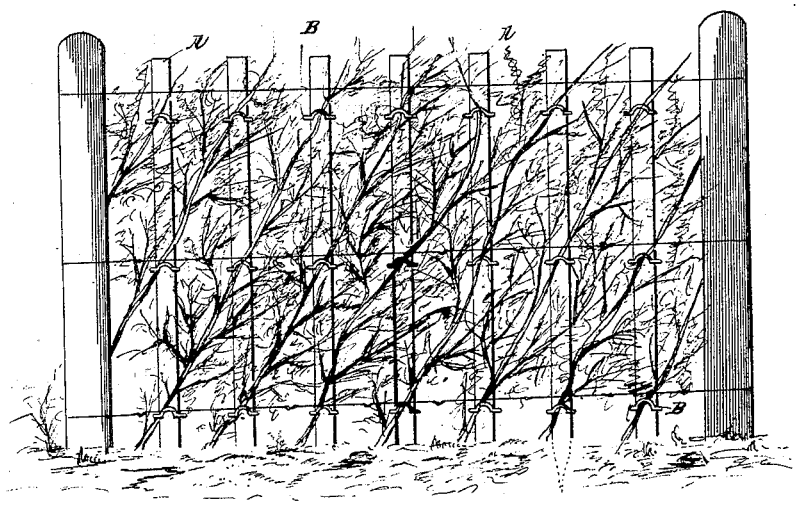
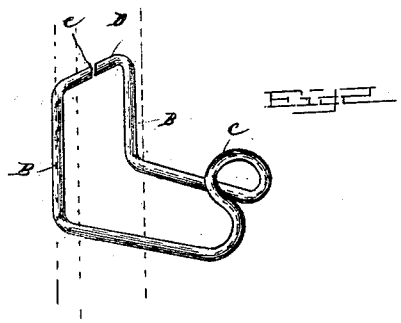
Fig. 2.
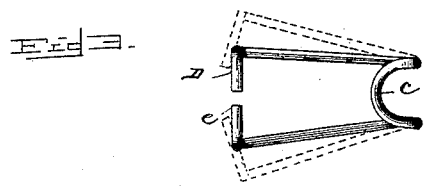
Fig. 3.
Witnesses
Paul W. Stevens
Mercer Myers
Inventor
Martin L. Main
By his Attorneys
Myers & Co.

UNITED STATES PATENT OFFICE.

MARTIN L. MAIN, OF WESTMINSTER, MARYLAND.

HEDGE AND WIRE-WOVEN FENCE.

SPECIFICATION forming part of Letters Patent No. 426,291, dated April 22, 1890.

Application filed December 10, 1889. Serial No. 333,219. (No model.)

*To all whom it may concern:*

Be it known that I, MARTIN L. MAIN, a citizen of the United States of America, residing at Westminster, in the county of Carroll and State of Maryland, have invented certain new and useful Improvements in Combined Hedge and Wire-Woven Fences, of which the following is a specification, reference being had therein to the accompanying drawings.

My invention pertains to an improvement in hedge fences; and it consists in a wire-woven lath, pole, slat, or paling fence comprising as a part thereof clamp-guides for securely holding the hedge, and in the peculiar combination and arrangement of the parts, substantially as hereinafter more fully shown and described.

In the accompanying drawings, Figure 1 is a front elevation of my hedge fence, and Fig. 2 is a perspective detail view of one of the fasteners. Fig. 3 is a detail plan view of my fastener, the spring-arms being shown spread apart by dotted lines.

The object of my improvement is to produce not only a permanent and enduring hedge fence, but one available for immediate use, as against all kinds of stock during the growth of the hedge.

In constructing it I weave together laths, slats, poles, or palings A into wire-woven fence, as shown, and dispose upon each lath hook-guides B. These are clamped upon the laths or slats at intervals apart suitable for holding and training the hedge during the period of its growth.

Hook-guides B each consist of a strand of wire having correspondent meeting ends *a*, which in continuation project alike horizontally and thence at right angles vertically downward and thence again at right angles horizontally and slightly converged to produce an elastic clamp, and thence curved to enclasp the hedge, as shown. In attaching the hook-guides B to the laths or slats the ends of the wire strands are spread apart and attached thereto and remain preferably slightly spread apart, as shown at *e*, which causes the clamp-guides to clamp the laths or slats and prevents the same from slipping down on the lath. The hook-guides, through which the planted hedge is passed and obliquely trained, serve to hold the hedge as aligned in position and prevent its being blown down, and thus a durable and permanent hedge fence results, which survives decay of the wire fence. Thus constructed a hedge fence comparatively inexpensive, complete, and durable is produced.

Having thus fully described my invention, what I claim, and desire to secure by Letters Patent, is—

A hedge fence composed of live plants secured diagonally to a lath, slat, pole, or paling fence by means of guide-hooks securely clamped upon the slats of the fence, the guide-hooks being each formed of a strand of wire having meeting ends, thence horizontally projecting, thence at right angles vertically, and thence at right angles horizontally and in continuation converging and curved to enclasp the hedge, substantially as shown and described.

In testimony whereof I affix my signature in presence of two witnesses.

MARTIN L. MAIN.

Witnesses:
HUGO E. FIDDIS,
CHAS. E. HUNIG.